United States Patent
Needham et al.

(10) Patent No.: US 7,576,686 B2
(45) Date of Patent: Aug. 18, 2009

(54) METHOD AND SYSTEM FOR CALIBRATING AN ANTENNA ARRAY FOR AN AIRCRAFT SURVEILLANCE SYSTEM

(75) Inventors: Edward W. Needham, Wellsville, KS (US); John C. Blessing, Spring Hill, KS (US)

(73) Assignee: Garmin International, Inc., Olathe, KS (US)

(*) Notice: Subject to any disclaimer, the term of this patent is extended or adjusted under 35 U.S.C. 154(b) by 0 days.

(21) Appl. No.: 11/462,942

(22) Filed: Aug. 7, 2006

(65) Prior Publication Data
US 2009/0109085 A1 Apr. 30, 2009

(51) Int. Cl.
G01S 7/40 (2006.01)
(52) U.S. Cl. .................. 342/174; 342/165; 342/29
(58) Field of Classification Search ............ 342/174, 342/29–40, 165, 173
See application file for complete search history.

(56) References Cited

U.S. PATENT DOCUMENTS

| | | | |
|---|---|---|---|
| 2,489,304 A | 11/1949 | Marchand et al. |
| 3,212,089 A | 10/1965 | Longacre et al. |
| 3,500,303 A | 3/1970 | Johnson |
| 3,697,876 A | 10/1972 | Robbins et al. |
| 3,787,863 A | 1/1974 | Watanabe et al. |
| 3,789,408 A | 1/1974 | Ichihara et al. |
| 3,824,595 A | 7/1974 | Hall |
| 3,878,381 A | 4/1975 | Broder et al. |
| 3,887,923 A | 6/1975 | Hendrix |
| 3,890,617 A | 6/1975 | Moulton |
| 3,927,406 A | 12/1975 | Bruder |
| 3,935,575 A | 1/1976 | Leisterer et al. |
| 3,973,262 A | 8/1976 | Böhm |
| 4,000,466 A | 12/1976 | Scouten et al. |
| 4,090,199 A | 5/1978 | Archer |
| 4,123,759 A | 10/1978 | Hines et al. |
| 4,203,114 A | 5/1980 | Gerst et al. |
| 4,209,791 A | 6/1980 | Gerst et al. |
| 4,333,170 A | 6/1982 | Mathews et al. |

(Continued)

OTHER PUBLICATIONS http://embeddeddsp.embedded.com/showArticle.jhtml;jsessionid=XBDNFUFIRPSRWQSNDLPCKHSCJUNN2JVN?articleID=60401726; 10 pages; printed Aug. 7, 2006.

(Continued)

Primary Examiner—Thomas H Tarcza
Assistant Examiner—Cassi Galt
(74) Attorney, Agent, or Firm—Samuel M. Korte (57) ABSTRACT

In accordance with one aspect of the present invention, a method is provided for calibrating an aircraft surveillance system for a protected aircraft. The system has a phased antenna array comprising antenna elements. The method comprises transmitting a first signal from a first antenna element in the array, and receiving the first signal at a third antenna element. The first signal may represent an interrogation signal transmitted in connection with a surveillance transmit sequence to locate potential intruding aircraft into a range of the protected aircraft. The method further includes transmitting a second signal from a second antenna element and receiving the second signal at the third antenna element. The method also includes calculating calibration information for the antenna array based on the first and second signals received at the third antenna element. During each transmit operation only a single antenna element transmits at one point in time.

22 Claims, 7 Drawing Sheets

U.S. PATENT DOCUMENTS

| | | | |
|---|---|---|---|
| 4,366,483 A | 12/1982 | Hagedon et al. | |
| 4,488,155 A | 12/1984 | Wu | |
| 4,591,862 A | 5/1986 | Parkhurst et al. | |
| 4,626,859 A | 12/1986 | Stansfield | |
| 4,638,320 A | 1/1987 | Eggert et al. | |
| 4,638,321 A | 1/1987 | Drogin | |
| 4,639,733 A | 1/1987 | King et al. | |
| 4,689,623 A | 8/1987 | Schwab et al. | |
| 4,719,465 A | 1/1988 | Kuroda | |
| 4,796,031 A | 1/1989 | Koki | |
| 4,809,012 A | 2/1989 | Tong | |
| 4,855,748 A | 8/1989 | Brandao et al. | |
| 4,888,593 A | 12/1989 | Friedman et al. | |
| 4,899,157 A | 2/1990 | Sanford et al. | |
| 4,924,232 A | 5/1990 | Hudson et al. | |
| 4,926,184 A | 5/1990 | Galati et al. | |
| 4,947,176 A | 8/1990 | Inatsune et al. | |
| 4,975,710 A | 12/1990 | Baghdady | |
| 4,996,532 A | 2/1991 | Kirimoto et al. | |
| 5,003,314 A | 3/1991 | Berkowitz et al. | |
| 5,008,844 A | 4/1991 | Kyriakos et al. | |
| 5,072,224 A | 12/1991 | Vebeke et al. | |
| 5,122,808 A | 6/1992 | Kyriakos | |
| 5,191,349 A | 3/1993 | Dinsmore et al. | |
| 5,253,188 A | 10/1993 | Lee et al. | |
| 5,263,189 A * | 11/1993 | Kultgen et al. | 455/276.1 |
| 5,341,145 A | 8/1994 | Eckersten et al. | |
| 5,469,172 A | 11/1995 | Schleder et al. | |
| 5,541,607 A | 7/1996 | Reinhardt | |
| 5,541,608 A | 7/1996 | Murphy et al. | |
| 5,552,788 A | 9/1996 | Ryan et al. | |
| 5,568,154 A | 10/1996 | Cohen | |
| 5,589,838 A | 12/1996 | McEwan | |
| 5,598,437 A | 1/1997 | Gourse | |
| 5,604,504 A | 2/1997 | Nail | |
| 5,619,206 A | 4/1997 | Cole, Jr. et al. | |
| 5,657,027 A | 8/1997 | Guymon, II | |
| 5,724,047 A | 3/1998 | Lioio et al. | |
| 5,764,187 A | 6/1998 | Rudish et al. | |
| 5,815,117 A | 9/1998 | Kolanek | |
| 5,867,535 A | 2/1999 | Phillips et al. | |
| 5,889,491 A | 3/1999 | Minter | |
| 5,943,010 A | 8/1999 | Rudish et al. | |
| 6,018,644 A | 1/2000 | Minarik | |
| 6,054,948 A | 4/2000 | Dean | |
| 6,064,338 A | 5/2000 | Kobayakawa et al. | |
| 6,085,151 A | 7/2000 | Farmer et al. | |
| 6,127,966 A * | 10/2000 | Erhage | 342/174 |
| 6,169,519 B1 | 1/2001 | Holecek et al. | |
| 6,204,812 B1 | 3/2001 | Fattouche | |
| 6,236,839 B1 * | 5/2001 | Gu et al. | 455/67.14 |
| 6,285,313 B1 | 9/2001 | Wahab et al. | |
| 6,392,598 B1 | 5/2002 | Jones et al. | |
| 6,433,738 B1 | 8/2002 | Kikuchi | |
| 6,441,783 B1 | 8/2002 | Dean | |
| 6,486,839 B1 | 11/2002 | Minter | |
| 6,529,820 B2 | 3/2003 | Tomescu | |
| 6,587,069 B2 | 7/2003 | Ringwald et al. | |
| 6,587,863 B1 | 7/2003 | Gentile et al. | |
| 6,611,231 B2 | 8/2003 | Crilly, Jr. et al. | |
| 6,693,588 B1 * | 2/2004 | Schlee | 342/368 |
| 6,727,842 B1 | 4/2004 | Schleder et al. | |
| 6,778,138 B2 | 8/2004 | Purdy et al. | |
| 6,778,147 B2 * | 8/2004 | Sanada et al. | 343/853 |
| 6,792,033 B1 | 9/2004 | Maruta et al. | |
| 6,795,018 B2 | 9/2004 | Gou | |
| 6,999,022 B1 | 2/2006 | Vesel et al. | |
| 7,098,847 B2 * | 8/2006 | Li | 342/368 |
| 2003/0142012 A1 * | 7/2003 | Hirabe | 342/173 |
| 2007/0069945 A1 * | 3/2007 | Weese | 342/174 |

OTHER PUBLICATIONS

Interferometer Design for Evaluation Angle Estimation, IEEE Transactions on Aerospace and Electronic Systems, vol. AEX-13, No. 5, pp. 486-503 (Sep. 1977).
RJ Zavrel, RF Design, Mar. 1988, pp. 27-31.

* cited by examiner

METHOD AND SYSTEM FOR CALIBRATING AN ANTENNA ARRAY FOR AN AIRCRAFT SURVEILLANCE SYSTEM

BACKGROUND OF THE INVENTION

The present invention generally relates to calibration of aircraft systems and more specifically to methods and systems for calibrating an antenna array for an aircraft surveillance system.

Today, systems exist for use in aircraft surveillance for collision avoidance and traffic alert. These conventional systems use active interrogation of mode select (mode-S) and Air-Traffic Control Radar Beacon System (ATCRBS) transponders that can incorporate a passive phased array antenna. Conventional mode-S and ATCRBS transponders transmit encoded messages containing information about the aircraft in response to interrogation signals received from ground based radar or from an aircraft with a traffic alert system (TAS), or traffic alert and collision avoidance system (TCAS I or TCAS II). When the transponder is not transmitting, it monitors for transmissions including interrogation signals.

The Minimum Operating Performance Specifications (MOPS) for the TCAS II system is described in RTCA document DO-185A, "Minimum Operational Performance Standards for Air Traffic Alert and Collision Avoidance System II (TCAS II) Airborne Equipment", dated December 1997 and the MOPS for TCAS I and TAS are described in RTCA document DO197A, "Minimum Operational Performance Standards for Active Traffic Alert and Collision Avoidance System I (Active TCAS I)" both of which are incorporated herein by reference.

TAS, TCAS equipment transmit interrogation signals that are received and replied to by other aircraft and used to determine the location of other aircraft relative to the originating aircraft position. Conventional TAS and TCAS systems can include a 4-element interferometer type antenna coupled, to a radio frequency (RF) transmitter/receiver. The transmitter and receiver are remotely coupled to the antenna array by coaxial transmission lines. The coaxial transmission lines may be several feet in length (e.g. 30 feet long). The antenna arrays utilized by conventional TCAS systems are "passive" in that substantially all of the power utilized to drive the antenna array elements is produced at the remote transmitter. Similarly, all of the capability used to boost the receive range of the antenna array is provided at the remote receiver both with their inherent loss and degradation of performance.

The transmitter and receiver are in turn coupled to a signal processor that controls transmission and reception of TAS, TCAS I, and TCAS II related information and that performs aircraft surveillance operations, such as traffic alert and collision avoidance operations. The transmitter is coupled to the signal processor for transmitting, among other things, interrogation signals. A control panel and display are joined to the signal processor for operating the TAS, TCAS I, and TCAS II system and for displaying TAS, TCAS I, and TCAS II information.

The TCAS system identifies the location and tracks the progress of aircraft equipped with beacon transponders. Currently, there are three versions of the surveillance systems in use; TAS, TCAS I, and TCAS II. TAS is the simplest and least expensive of the alternatives. TCAS I is less expensive but also less capable than TCAS II. The TCAS I transmitter sends signals and interrogates ATCRBS transponders. The TCAS I receiver and display indicate approximate bearing and relative altitude of all aircraft within the selected range (e.g., about forty miles). Further, the TCAS system uses color coded dots to indicate which aircraft in the area pose a potential threat (e.g., potential intruder aircraft). The dots are referred to as a Traffic Advisory (TA). When a pilot receives a TA, the pilot then visually identifies the intruder aircraft and is allowed to deviate up to 300 feet vertically. Lateral deviation is generally not authorized. In instrument conditions, the pilot notifies air traffic control for assistance in resolving conflicts.

The TCAS II system offers all of the benefits of the TCAS I system, but also issues a Resolution Advisory (RA) to the pilot. In the RA, the intruder target is plotted and the TCAS II system determines whether the intruder aircraft is climbing, diving, or in straight and level flight. Once this is determined, the TCAS II system advises the pilot to execute an evasive maneuver that will resolve the conflict with the intruder aircraft. Preventive RAs may instruct the pilot not to change altitude or heading to avoid a potential conflict. Positive RAs instruct the pilot to climb or descend at a predetermined rate of 2500 feet per minute to avoid a conflict. TCAS II is capable of interrogating Mode-C and Mode-S transponders. When both aircraft have Mode-S interrogation capability, the TCAS II systems communicate with one another and issue de-conflicted RAs.

Each of the above-described surveillance systems can utilize a phased antenna array that, during transmission operations, performs antenna pattern formation and, during reception operations, determines bearing angle of arrival to intruding aircraft. Conventional phased antenna arrays are passive and are driven by high power that is conveyed over separate transmission lines associated with each antenna element. The cables within the transmission line introduce insertion phase, which represents a phase shift due to the length and characteristics of the cable. The insertion phase, if not corrected, creates errors in transmit and receive operations. Insertion phase may also be introduced by the system electronics (e.g., drivers, mixers, LNA and the like). Each transmit channel and each receive channel may exhibit a different degree of insertion phase. If left un-corrected, the insertion phase will affect bearing determinations and create erroneous readings by the system. The insertion phase may also change over time, as well as with temperature and due to circuit nonlinearities. Thus, insertion phase cannot be corrected through preset bearing offsets. To correct for insertion phase, the system periodically performs calibration operations to calculate insertion phase associated with each receive channel and each transmit channel.

Heretofore, conventional systems have performed complicated calibration operations through the use of analog phase detectors and analog mixer components. The analog phase detectors and mixers exhibit inherent nonlinearities that must also be calibrated out of the system through a separate step in the calibration process. Also, conventional calibration operations require multiple steps to calibrate out the unknown and variable receiver and cable insertion phases, as well as to calibrate the phase detectors. For example, certain systems perform a multi-segment calibration sequence and average multiple calibration signals. In addition, conventional systems establish numerous reference points for the cables, receivers and phase detectors, each of which requires a calibration sequence.

Moreover, the conventional calibration circuits are expensive, large in size, require a relatively long period of time to perform the calibration operation and may still exhibit inaccuracies. Conventional systems are unable to simultaneously perform surveillance related operations and calibration operations. Instead, conventional systems suspend surveillance related transmissions while performing calibration of transmit and receive channels.

BRIEF DESCRIPTION OF THE INVENTION

In accordance with one aspect of the present invention, a method is provided for calibrating an aircraft surveillance system for a protected aircraft. The system has a phased antenna array comprising antenna elements. The method comprises transmitting a first signal from a first antenna element in the array, and receiving the first signal at a third antenna element. The first signal may represent an interrogation signal transmitted in connection with a surveillance transmit sequence to locate potential intruding aircraft into a range of the protected aircraft. The method further includes transmitting a second signal from a second antenna element and receiving the second signal at the third antenna element. The method also includes calculating calibration information for the antenna array based on the first and second signals received at the third antenna element. During each transmit operation only a single antenna element transmits at one point in time.

The interrogation signal may constitute one or more steps or sequences within a Whisper/Shout ATCRBS pulse sequence. The antenna array may constitute an active antenna array including calibration paths built into the antenna module to permit power amplifiers and low noise amplifiers and mixers to be bypassed when calibrating the transmit and receive channels. The calculation includes determining phase calibration offsets at the antenna elements and storing the phase calibration offsets in a look-up table. The transmit calibration function provides directional patterns of the interrogation signal within one sector of the range about the protected aircraft.

In accordance with another embodiment, a method is provided for calibrating an aircraft surveillance system for a protected aircraft. The system has a phased antenna array comprising antenna elements. The method comprises transmitting a first interrogation signal from a first antenna element in the antenna array. The first interrogation signal constitutes part of a surveillance transmit sequence to locate potential intruding aircraft within a range of the protected aircraft. The method also includes receiving the first interrogation signal at a second antenna element in the antenna array and calculating calibration information for the antenna array based on the first interrogation signal received by the second antenna element. During the transmitting operation, only a single antenna element transmits at one point in time.

In accordance with another embodiment, a method is provided for calibrating an aircraft surveillance system for a protected aircraft. The system has an antenna module with antenna elements selectively joined to separate transmit, receive and calibration paths provided in the antenna module, where the transmit path includes a transmit power amplifier. The method comprises joining a first antenna element to a corresponding first calibration path interconnecting the first antenna element and a transmission line to bypass the transmit power amplifier in the transmit path. The method includes conveying a receive calibration signal over the first calibration path to the first antenna element for transmission. The method also includes measuring the receive calibration signal transmitted from the first antenna element at second and third antenna elements and calibrating the second and third antenna elements based on measurement of the receive calibration signal.

DETAILED DESCRIPTION OF THE INVENTION

Embodiments of the present invention are described in connection with an automatic calibration system for a Traffic Alert System (TAS), or Traffic Collision Avoidance System (TCAS I and TCAS II). However, it is understood that the present invention may be utilized in other aircraft surveillance applications. In one implementation, the automatic calibration system operates with a multi-element active phased array antenna that includes multiple transmitter channels, multiple amplitude and phase detecting receiver channels, and a digital signal processing module configured to process phase and amplitude data and calculate correction phase offsets for each receive channel and each transmit channel. In certain embodiments, the correction offsets for the receive channels afford bearing correction. In certain embodiments, the correction offsets for the transmit channels enable the transmitters to achieve proper antenna pattern phasing (e.g., for directional or omni-directional transmissions).

Figure 1:
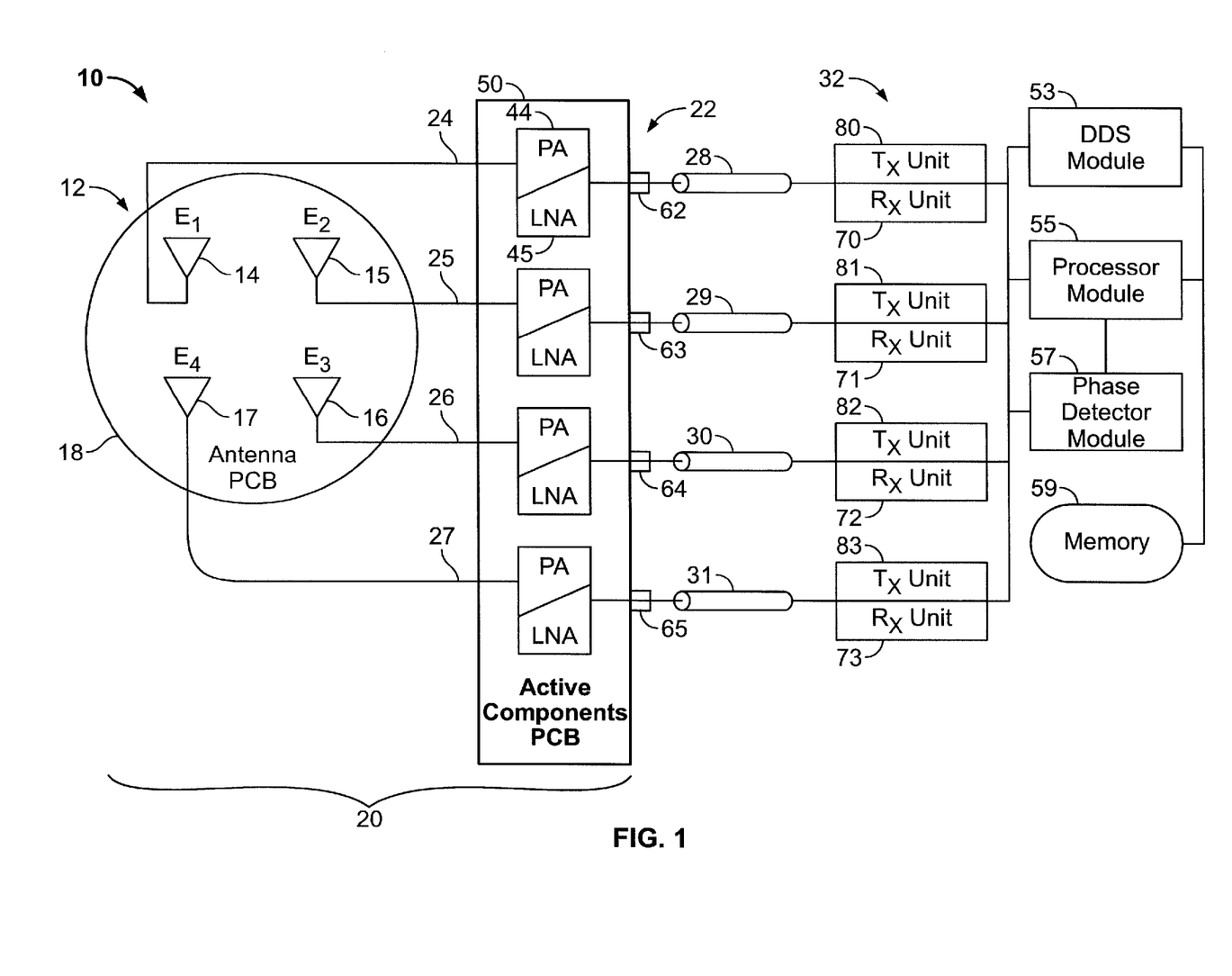
FIG. 1 illustrates a block diagram of a surveillance system implemented in accordance with an embodiment of the present invention.

FIG. 1 illustrates a block diagram of an active phased array antenna system 10 that is formed in accordance with an embodiment of the present invention. The system 10 includes an antenna array 12 that comprises a plurality of antenna elements 14-17, each of which is mounted to a common antenna printed circuit board (PCB) 18. The antenna elements 14-17 transmit and receive RF transmit and receive signals, for example at 1030 MHz and 1090 MHz, respectively. Each antenna element 14-17 communicates over a separate physical channel 24-27 (also referred to as channels E1 to E4) within the antenna module 20. In the exemplary embodiment of FIG. 1, four antenna elements 14-17 and four channels 24-27 are utilized. Optionally, fewer than four or more than four antenna elements 14-17 and channels 24-27 may be utilized.

The antenna array 12 forms part of an antenna module 20 that is configured to be mounted to an aircraft. The antenna module 20 includes an active component PCB 50 that is interposed between the antenna PCB 18 and transmission lines 28-31, corresponding to channels 24-27 E1 to E4, respectively. The active component PCB 50 includes power amplifiers 44 and low noise amplifiers 45 provided along each of the channels 24-27. The power amplifiers 44 are utilized during transmission operations, while the low noise amplifiers 45 are utilized during receive operations. The antenna module 20 also includes a connector module (generally denoted by area 22) that includes separate coaxial connector elements 62-65 that are associated with each of the channels 24-27. The connector module 22 is configured to couple transmission lines 28-31 with associated corresponding channels 24-27, respectively. The transmission lines 28-31 may be coaxial lines that convey transmit and receive signals in a multiplexed manner between the antenna module 20 and a remote transmit/receive (T/R) unit 32. The coaxial lines convey transmit and receive signals at low power (e.g., less than 10 W). Each of the transmission lines 28-31 transmits and receives electrical transmit and receive signals, respectively, to and from the T/R unit 32. For example, the T/R unit 32 transmits interrogation signals to the antenna array 12 and receives reply information from the antenna array 12 as well as handling the associated transmit and receive calibration operations.

The term "cross" shall be used throughout the present application to refer to particular relationships of antenna elements, receive signals channels and the like. For example, the term "cross antenna elements" shall refer to antenna elements that are located diagonally across from one another, such as antenna elements 14 and 16, in the antenna array 12. Antenna elements 15 and 17 also represent cross antenna elements. Similarly, "cross channels" and "cross receive signals" shall refer to channels and receive signals, respectively, joined and associated with cross antenna elements within the antenna array 12. For example, channels 24 and 26 constitute "cross channels", and receive signals conveyed over transmission lines 29 and 31 constitute "cross receive signals".

The T/R unit 32 includes transmitter units 80-83 and receiver units 70-73 that are joined to corresponding transmission lines 28-31. The transmitter and receiver units 80-83 and 70-73 are joined to a direct digital synthesis (DDS) module 53, a processor module 55 and a phase detector module 57. The processor module 55 and DDS module 53 communicate with the phase detector module 57 and access memory 59 to store and retrieve calibration information. The DDS module 53 performs beam forming in connection with transmit operations. The DDS module 53 directs transmitter units 80-83 to transmit, from corresponding antenna elements 14-17, interrogation signals in connection with surveillance transmit sequences. The surveillance transmit sequences are intended to locate potential intruding aircraft within a range surrounding the protected aircraft including the system 10. The phase detector module 57 receives, from the receiver units 70-73, signals received at the antenna elements 14-17 and determines phase differences between various channels 24-27. The processor module 55 calculates transmit and receive calibration information for the antenna array 12 based on the interrogation signals measured at the receiver units 70-73. By way of example, transmit calibration information may be calculated based on signals received from a surveillance transmit sequence that forms part of a Whisper/Shout ATRCBS pulse sequence or a Mode-S pulse sequence.

During calibration, the phase detector module 57 calculates phase differences between receive calibration signals measured at certain combinations of the antenna elements 14-17, as explained below in more detail. The processor module 55 derives phase calibration offsets associated with each channels 24-27 from the phase differences. The phase calibration offsets correct for insertion phase introduced by the transmission lines 28-31, components within the T/R unit 32, components upon the active component PCB 50 and the like.

Figure 2:
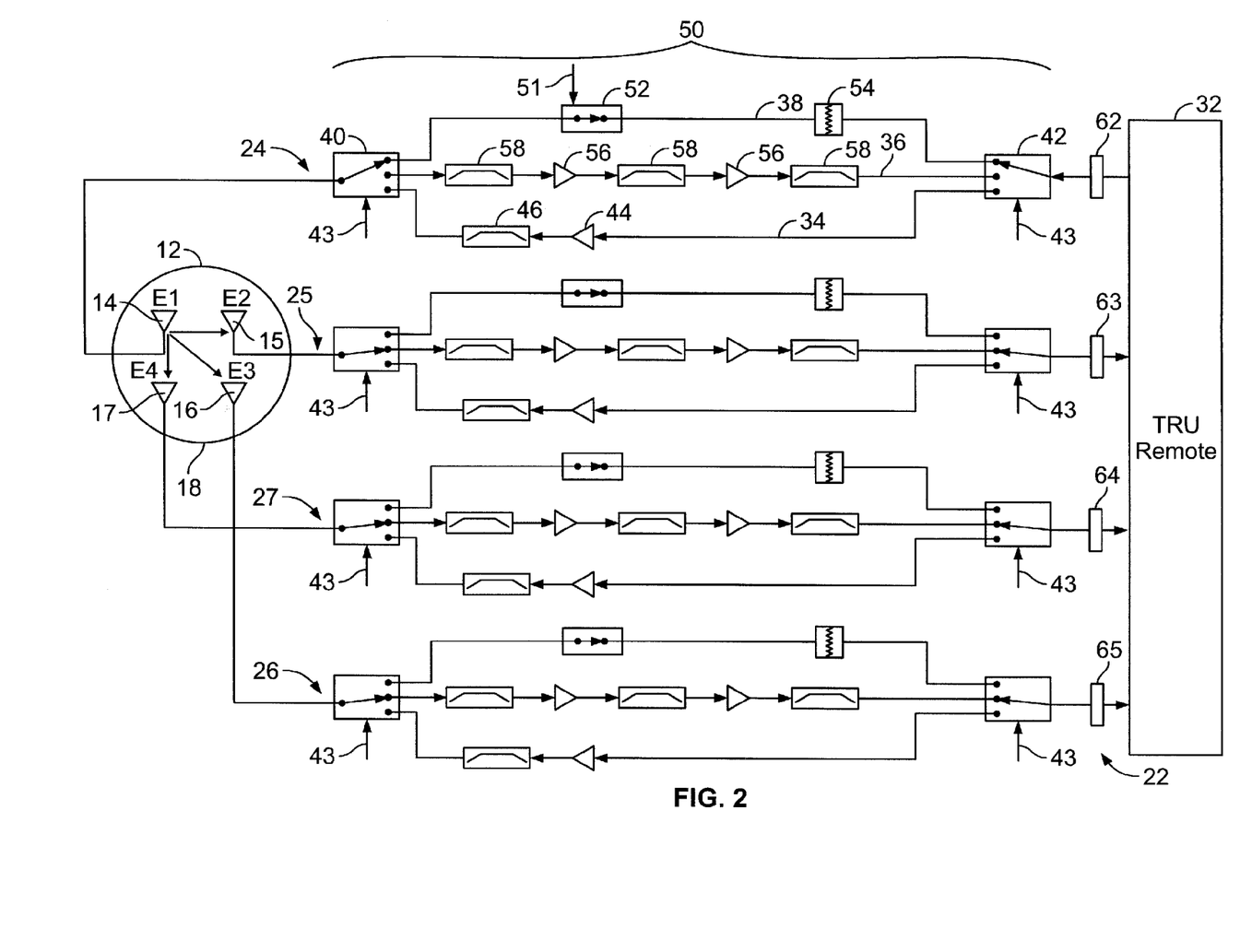
FIG. 2 illustrates a block diagram of a sub-system within the system of FIG. 1.

FIG. 2 illustrates a more detailed block diagram of the signal paths and components within an exemplary implementation of the active component PCB 50. The antenna elements 14-17 are directly mounted to the antenna PCB 18. The active component PCB 50 may be provided within the interior surface of an aircraft, and immediately adjacent to, the antenna PCB 18 which is provided upon the exterior surface of the aircraft. The active component and antenna PCBs 50 and 18 may be coupled to one another directly through contacts extending through the exterior of the aircraft.

The channels 24-27 extend through the active component PCB 50. The following discussion of the structure of FIG. 2 shall refer to one channel (e.g., channel 24), although it is understood that each channel 24-27 includes similar structure. Within the active component PCB 50, each channel 24-27 includes a transmit path 34, a receive path 36, and a calibration path 38. The transmit, receive and calibration paths 34, 36, 38 are parallel to one another and extend between switches 40 and 42 that are connected to the corresponding antenna elements 14-17 and corresponding connector elements 62-65 within the connector module 22. The term "transmit channel" shall refer to a path through the T/R unit 32 over a corresponding transmission link 28-31 and transmit path 34 to/from an antenna element 14-17. The term "receive channel" shall refer to a path from an antenna element 14-17 over a corresponding receive path 36 and transmission link 28-31 through the T/R unit 32. The term "calibration channel" shall refer to a path through the T/R unit 32 over a corresponding transmission link 28-31 and calibration path 38 to/from an antenna element 14-17. The switches 40 and 42 are controlled by control signals 43 to selectively choose one of transmit, receive and calibration paths 34, 36, 38 based on a particular operation to be carried out by the T/R unit 32. The control signals 43 are separately provided for each of the channels 24-27 from the T/R unit 32 to provide individual control over a state or position of each switch 40 and 42.

The transmit path 34 includes the high power amplifier 44 in series with a bandpass filter 46. The power amplifier 44 is provided within the antenna module 20 and located along the transmit path 34 in order to increase the power level of the electrical transmit signals from a low power level received from the transmission line 28. The power amplifier 44 increases the power level of the electrical transmit signal by an amount sufficient to drive the corresponding antenna element 14 to transmit RF transmit signals at a predetermined effective radiating power (ERP). The bandpass filter 46 removes undesirable high and low frequency components from the high power output of the power amplifier 44 before the electrical transmit signal is passed through the corresponding switch 40 to the antenna element 14.

The connector module 22 receives from the transmission line 28, an electrical transmit signal at a low power level that is less than a predetermined ERP at which the RF transmit signal is to be transmitted from the corresponding antenna element 14. By way of example only, the connector module 22 may receive, from the transmission line 28, the electrical transmit signal at a low power level, such as between one and ten Watts. More preferably, the electrical transmit signal conveyed over the transmission line 28 may be between four and eight Watts and in certain applications at approximately six Watts.

The receive path 36 includes low noise amplifiers 56 and bandpass filters 58 joined in series to process a received electrical signal before transmission over the transmission line 28. The receive path 36 extends between the antenna element 14 and the connector module 22 in order to convey a RF receive signal there along. By way of example, the carrier frequency for the receive signal may be 1090 MHz, while the carrier frequency for the transmit signals may be 1030 MHz.

The calibration path 38 includes an isolation switch 52 provided in series with an attenuation element 54. The isolation switch 52 is opened and closed by an isolation control signal 51. The isolation control signal 51 opens the isolation switch 52 when switches 40 and 42 connect to the receive path 36 or the transmit path 34 in order to provide electrical isolation for the receive path 36 and transmit path 34. The calibration path 38 is utilized in connection with both transmit and receive calibration operations for the antenna array 12. The calibration path 38 provides a bypass around the low noise amplifiers LNAs 56 and filters 58 in the receive path 36, during a transmit calibration operation, and provides a bypass around the power amplifiers 44 and filters 46 in the transmit path 34, during a receive calibration operation. When the switches 40 and 42 connect to the calibration path 38, the attenuation element 54 decrease the power level of the receive signal, that is received at antenna element 14 resulting from a transmit calibration signal, before outputting the receive signal through the switch 42 on to the transmission line 28. To determine the transmit phase offsets, the calibration path 38 provides phase information at the input to the receive units 70-73 in the T/R unit 32. To determine the receive phase offsets, the calibration path 38 provides a path for the 1090 MHz signal from the transmit units 80-83 in the T/R unit 32. The calibration path 38 also allows direct access to each antenna element 14-17 by the T/R unit 32, by means of appropriate switching, to support additional use of the antenna elements 14-17 for additional L-band equipment usage such as Transponder, DME, or Universal Access Transceiver (UAT).

The system 10 uses a direct intermediate frequency (IF) sampling method for receive and transmit phase determination. The system 10 digitally samples the received interrogation signals at the intermediate frequency to provide a cheap, small, and accurate means of phase detection.

Figure 3:
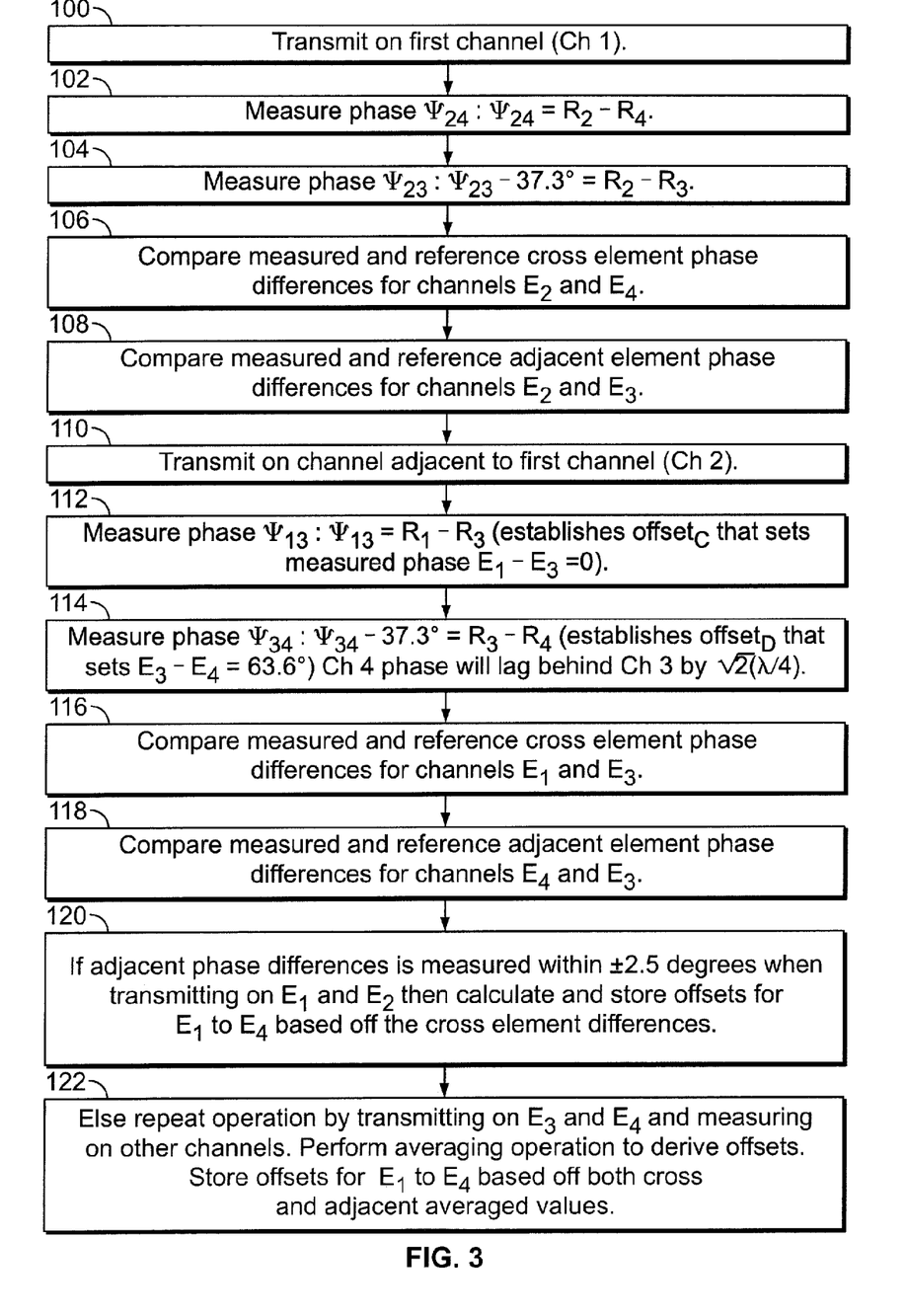
FIG. 3 illustrates a processing sequence carried out in connection with a receive calibration operation.

FIG. 3 illustrates a receive calibration processing sequence carried out by the processor module 55 to calibrate each of the receive channels 24-27. First, switches 40 and 42 are set to connect the calibration path 38 within channel 24 and to connect the receive paths 36 within channels 25-27. The receive calibration process may be reduced to only two steps. The receive calibration process begins, at 100, by transmitting a receive calibration signal over the calibration path 38 in channel 24 (also denoted channel E1) to antenna element 14. The receive calibration signal is transmitted as an RF signal at 1090 MHz from the antenna element 14 and is received at each of antenna elements 15-17 that convert the received RF signal to electrical signals. The received electrical signals are conveyed over corresponding receive paths 36 within channels 25-27. To the extent that insertion phase is introduced within each of channels 25-27, such insertion phase separately and distinctly impacts the phase of the corresponding electrical signals as propagating along channels 25-27 to the T/R unit 32. The phase detector module 57 measures, at 102, a cross element phase difference CROSS-PD24 between the received signals detected at antenna elements 15 and 17. The phase detector module 57 measures, at 104, an adjacent element phase difference ADJ-PD23 between the received signals detected at antenna elements 15 and 16.

Figure 4:
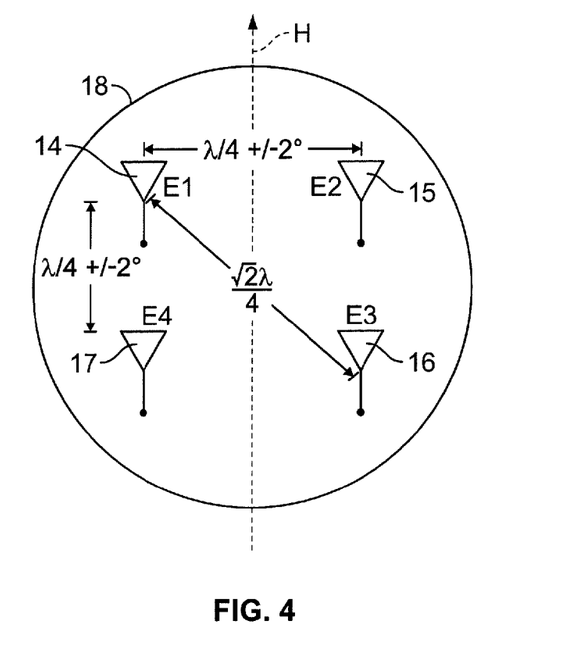
FIG. 4 illustrates an exemplary geometry for an antenna array.

FIG. 4 illustrates an exemplary geometry in which the antenna elements 14-17 are arranged on the antenna PCB 18. The antenna elements 14-17 are preferably spaced apart from one another in a square pattern and arranged relative to the heading H of the aircraft such that antenna elements 14 and 15 are spaced equal distances apart and transversely on opposite sides of the heading H. Antenna elements 16 and 17 are also spaced equal distances apart and transversely on opposite sides of the heading H. Antenna elements 16 and 17 trail the antenna elements 14 and 15 relative to the direction of the heading. Antenna element 15 is located adjacent antenna elements 14 and 16, while antenna element 16 is located adjacent antenna elements 17 and 15. Antenna elements 14 and 16 are located cross from one another, while antenna elements 17 and 15 are located cross from one another. It should be appreciated that, while we have found this to be the optimal configuration, other arrangements may be used. For example, three antenna elements may be arranged in a triangle pattern or five antenna elements may be arranged in a pentagon pattern.

In the preferred implementation, adjacent antenna elements are spaced apart by one quarter of the wavelength ($\lambda/4$) of the carrier signal utilized to drive antenna elements 14-17. Thus, cross antenna elements are spaced apart by $\sqrt{2}(\lambda/4)$ of the carrier signal. RF signals transmitted from antenna element 14 will be received at antenna element 15 within-($\lambda/4$) wavelengths. Based on the geometry of the antenna array 12, reference adjacent element phase differences can be calculated between antenna elements 15 and 16 and between antenna elements 16 and 17. Based on the geometry of the antenna array 12, reference cross element phase differences can be calculated between antenna elements 14 and 16 and between antenna elements 17 and 15. The reference adjacent and cross element phase differences are stored in memory 59.

When phases of the receive signals at T/R unit 32 are offset by more than the reference adjacent and cross element phase differences, the additional offset is due to the insertion phases discussed above (e.g., cable, mixers, LNAs, PA's, switches). Returning to FIG. 3, the phase detector module 57 measures the cross and adjacent element phase differences CROSS-PD24 and ADJ-PD23, at 102 and 104. The processor module 55 compares, at 106, the measured cross element phase difference CROSS-PD24 with the reference cross element phase difference to obtain a cross element offset. The processor module 55 also compares, at 108, the measured adjacent element phase difference ADJ-PD23 with the reference adjacent element phase difference to obtain an adjacent element offset. The cross and adjacent element offsets are stored in memory 59 (FIG. 1).

After 108, the switches 40 and 42 in channels 24 and 25 are changed to connect the receive path 36 in channel 24 and the calibration path 38 in channel 25. At 110, antenna element 15 transmits a receive calibration signal over the calibration path 38 in channel 25 (Channel E2). The receive calibration signal is received at each of antenna elements 14, 16 and 17 that convert the received signals to electrical signals that are conveyed over corresponding receive paths 36 within channels 24, 26 and 27. To the extent that insertion phases are introduced within any of channels 24, 26 and 27, such insertion phases individually impact phase of the corresponding electrical signals as propagating along channels 24, 26 and 27 to the T/R unit 32. The phase detector module 57 measures, at 112, a cross element phase difference CROSS-PD13 between the received signals detected at antenna elements 14 and 16 (E1 and E3). The phase detector module 57 measures, at 114, an adjacent element phase difference ADJ-PD34 between the received signals detected at antenna elements 16 and 17 (E3 and E4).

The processor module 55 compares, at 116, the measured cross element phase difference CROSS-PD13 with the reference cross element phase difference to obtain a receive channel cross element offset. The processor module 55 also compares, at 118, the measured adjacent element phase difference ADJ-PD34 with the reference adjacent element phase difference to obtain a receive channel adjacent element offset. The cross and adjacent element offsets for the receive channels are stored in memory 59.

In the foregoing manner, the receive calibration signal is transmitted sequentially over two adjacent antenna elements (channels E1 and E2) of the active phased antenna array 12 at the receive frequency of 1090 MHz. At 120, it is determined whether the measured adjacent element phase difference ADJ-PD43, when transmitting a receive calibration signal over channel 24 (E1), is within a predetermined margin (e.g., +/−2.5 degrees) of the measured adjacent element phase difference ADJ-PD34 when transmitting a receive calibration signal over channel 25 (E2). If the predetermined margin is satisfied at 120, then the measurements are declared valid and the cross element differences are used as the calibration offsets.

When the calculated receive calibration offsets are within the predetermined margin, then the processor module 55 determines that the antenna array 12 has established symmetry with two calibration operations. When the calculated receive calibration offsets are not within the predetermined margin, then at 122 the calibration operations of 100 to 120 in FIG. 3 are repeated for channels 26 and 27 (E3 and E4). For example, the process of FIG. 3 would be repeated by transmitting from channel E3, and receiving over channels E1, E2, and E4. The process would then be repeated by transmitting from channel E4 and receiving over channels E1-E3. The cross element offsets are derived from the transmit operation with the cross element offsets obtained at 102 and 108. Thereafter, the receive calibration offsets are averaged.

The averaging process includes the following sets of identities and equations:
1. CROSSPD24 is the cross phase difference between channels 2 and 4 when transmitting on channel 24 (E1).
2. ADJPD23 is the adjacent phase difference between channels 2 and 3 when transmitting on channel 24 (E1).
3. CROSSPD31 is the cross phase difference between channels 3 and 1 when transmitting on channel 25 (E2).
4. ADJPD34 is the adjacent phase difference between channels 3 and 4 when transmitting on channel 25 (E2).
5. CROSSPD42 is the cross phase difference between channels 4 and 2 when transmitting on channel 26 (E3).
6. ADJPD41 is the adjacent phase difference between channels 4 and 1 when transmitting on channel 26 (E3).
7. CROSSPD13 is the cross phase difference between channels 1 and 3 when transmitting on channel 27 (E4).
8. ADJPD12 is the adjacent phase difference between channels 1 and 2 when transmitting on channel 27 (E4).

The processor module 55 may perform three checks to validate the phase measurements if the preceding adjacent error test fails. These checks assume that during receive calibration there is an opportunity to receive FRUIT (False Replies Uncorrelated In Time). FRUIT may occur from transponders responding to other unrelated interrogations. If FRUIT is received in the middle of a calibration operation, it may invalidate the calibration results. To determine whether FRUIT has occurred, the processor module 55 performs the following three checks:

Check 1:

|CROSSPD24+CROSSPD42|<$\epsilon_1$;

Check 2:

|CROSSPD31+CROSSPD13|<$\epsilon_2$; and

Check 3:

|ADJPD23+ADJPD34+ADJPD41+ADJPD12−($\sqrt{2}$−1)|<$\epsilon_3$;

where the variable $\lambda$ is equivalent to 360°, and the variables $\epsilon_1$, $\epsilon_2$, and $\epsilon_3$ are all error toleration values (e.g., +/−2.5 degrees).

Next, the actual receiver channel phase offsets are found if the errors in measurement are determined to be tolerable by using all multiple measurements of this receive calibration cycle. If the error test fails the calibration process is reattempted. Using all multiple measurements for the receive channel to channel phase offsets improves the accuracy due to averaging. The following equations illustrate the preferred calculations for finding receive channel to channel phase offsets.

$$E_2 - E_4 = \frac{\begin{pmatrix} CROSSPD24 - CROSSPD42 + \\ ADJPD23 + ADJPD34 - \\ ADJPD12 - ADJPD41 \end{pmatrix}}{4}$$

$$E_3 - E_1 = \frac{\begin{pmatrix} CROSSPD31 - CROSSPD13 + \\ ADJPD34 + ADJPD41 - \\ ADJPD13 - ADJPD12 \end{pmatrix}}{4}$$

$$E_1 - E_2 = \frac{\begin{pmatrix} 2ADJPD12 - 2ADJPD41 - \\ 2ADJPD23 + CROSSPD13 + \\ CROSSPD42 - CROSSPD31 - \\ CROSSPD24 + (\sqrt{2} - 1)\frac{\lambda}{2} \end{pmatrix}}{6}$$

$$E_2 - E_3 = \frac{\begin{pmatrix} 2ADJPD23 - 2ADJPD12 - \\ 2ADJPd34 + CROSSPD24 + \\ CROSSPD13 - CROSSPD42 - \\ CROSSPD31 + (\sqrt{2} - 1)\frac{\lambda}{2} \end{pmatrix}}{6}$$

$$E_3 - E_4 = \frac{\begin{pmatrix} 2ADJPD34 - 2ADJPD23 - \\ 2ADJPD41 + CROSSPD31 + \\ CROSSPD24 - CROSSPD13 - \\ CROSSPD42 + (\sqrt{2} - 1)\frac{\lambda}{2} \end{pmatrix}}{6}$$

$$E_4 - E_1 = \frac{\begin{pmatrix} 2ADJPD41 - 2ADJPD34 - \\ 2ADJPD12 + CROSSPD42 + \\ CROSSPD31 - CROSSPD24 - \\ CROSSPD13 + (\sqrt{2} - 1)\frac{\lambda}{2} \end{pmatrix}}{6}$$

The processor module 55 next, at 122, calculates relative offsets for all receive channels E1 to E4 based on the cross and adjacent element offsets or the averaged values. This provides sufficient receiver channel calibration offsets (for adjacent and cross elements) to be applied to any subsequent bearing measurements.

In the foregoing manner, the system 10 calibrates the receive channels 24-27 associated with each of the antenna elements 14-17.

Next a process will be described whereby the system 10 calibrates the transmit channels associated with each of the antenna elements 14-17. As explained above, the active antenna module 20 includes, in addition to the antenna elements 14-17, active components including power amplifiers 44. The active phased antenna array 12 includes four non-coherent phase channels. In order to formulate directional antenna patterns, the antenna array 12 requires that each antenna element 14-17 be driven at a predetermined phase. To determine the phase for each transmit channel 24-27, a transmit calibration operation is performed. Even though the power amplifiers 44 in the transmit paths 34 are linear it is desirable to provide additional compensation across the dynamic range of the transmit paths 34, as well as across the total temperature variation that the system 10 is expected to experience.

The transmit calibration process is intended to correct for, among other things, insertion phase introduced into the transmit channels. The transmit calibration process may be carried out simultaneously with, and as part of, an aircraft surveillance transmission operation. Before explaining the transmit calibration process, an exemplary surveillance transmission operation will be described.

Figure 5:
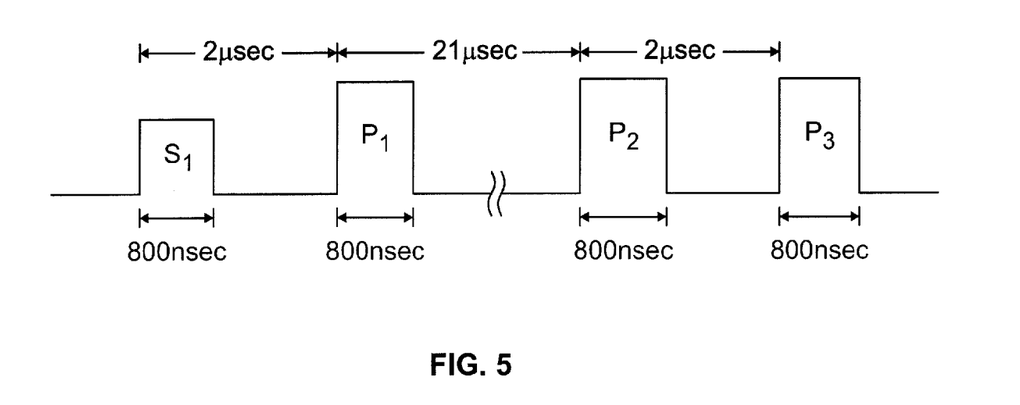
FIG. 5 illustrates a Whisper/Shout step within a Whisper/Shout sequence.
Figure 6:
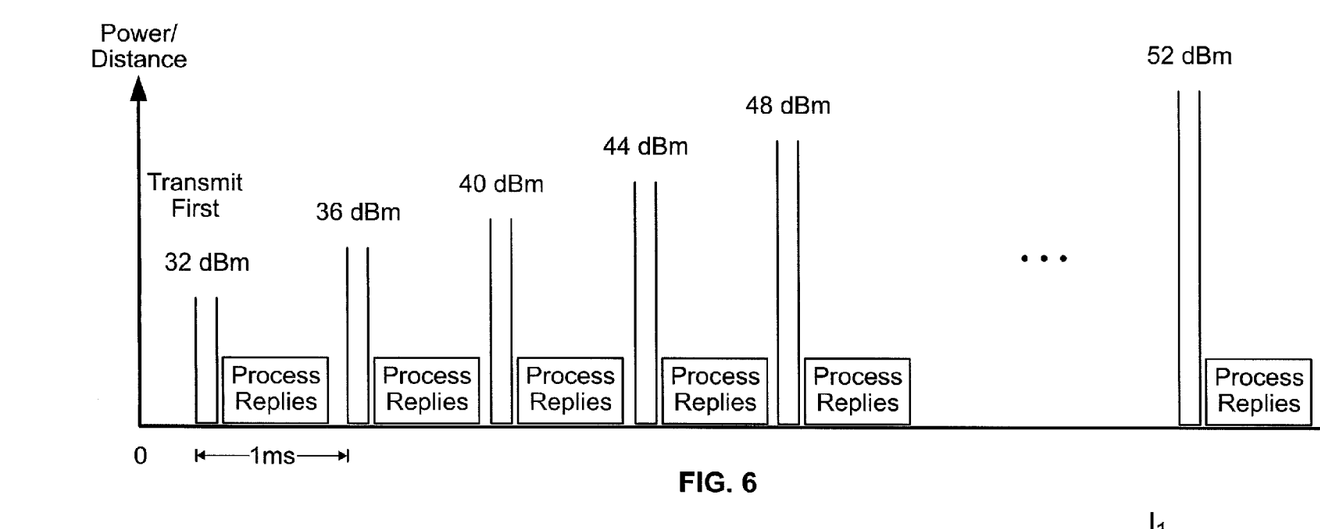
FIG. 6 illustrates an exemplary Whisper/Shout pulse sequence.
Figure 7:
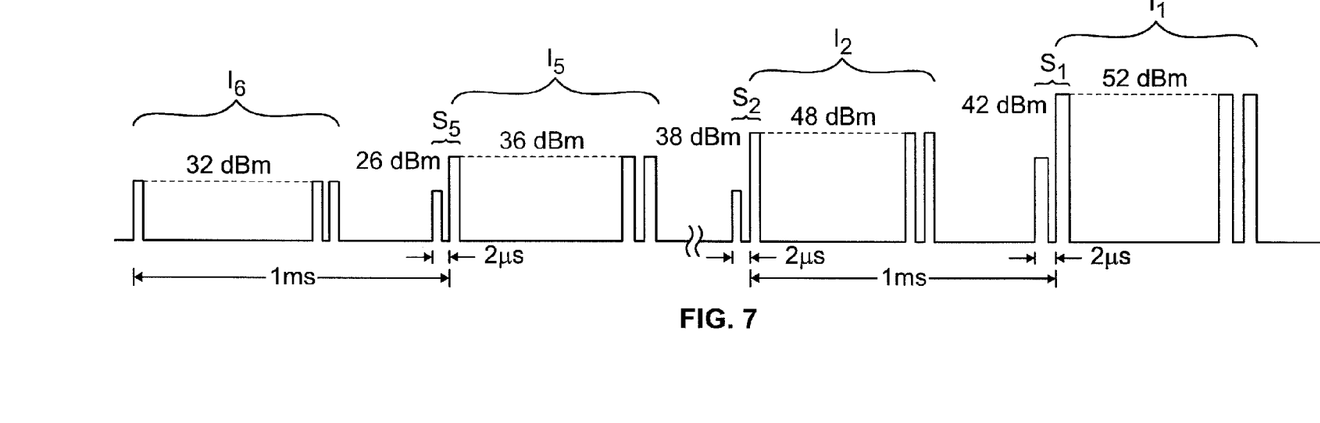
FIG. 7 illustrates an implementation of a Whisper/Shout pulse sequence during a transmit calibration operation.

FIGS. 5-7 illustrate exemplary pulse formats utilized in connection with one type of aircraft surveillance transmission operation. FIG. 5 illustrates a pulse sequence associated with a single Whisper/Shout step that includes an initial S1 pulse followed by a series of P-pulses, each of which are separated by predetermined time differences. In addition, each pulse has a predetermined pulse width and amplitude. FIG. 6 illustrates a Whisper/Shout sequence including a series of Whisper/Shout steps, each step of which is transmitted at progressively greater power levels between 32 dB and 52 dB. FIG. 7 illustrates a pulse sequence utilized when performing a calibration operation of the transmit channels simultaneously while performing a Whisper/Shout interrogation sequence in accordance with an embodiment of the present invention.

Figure 8:
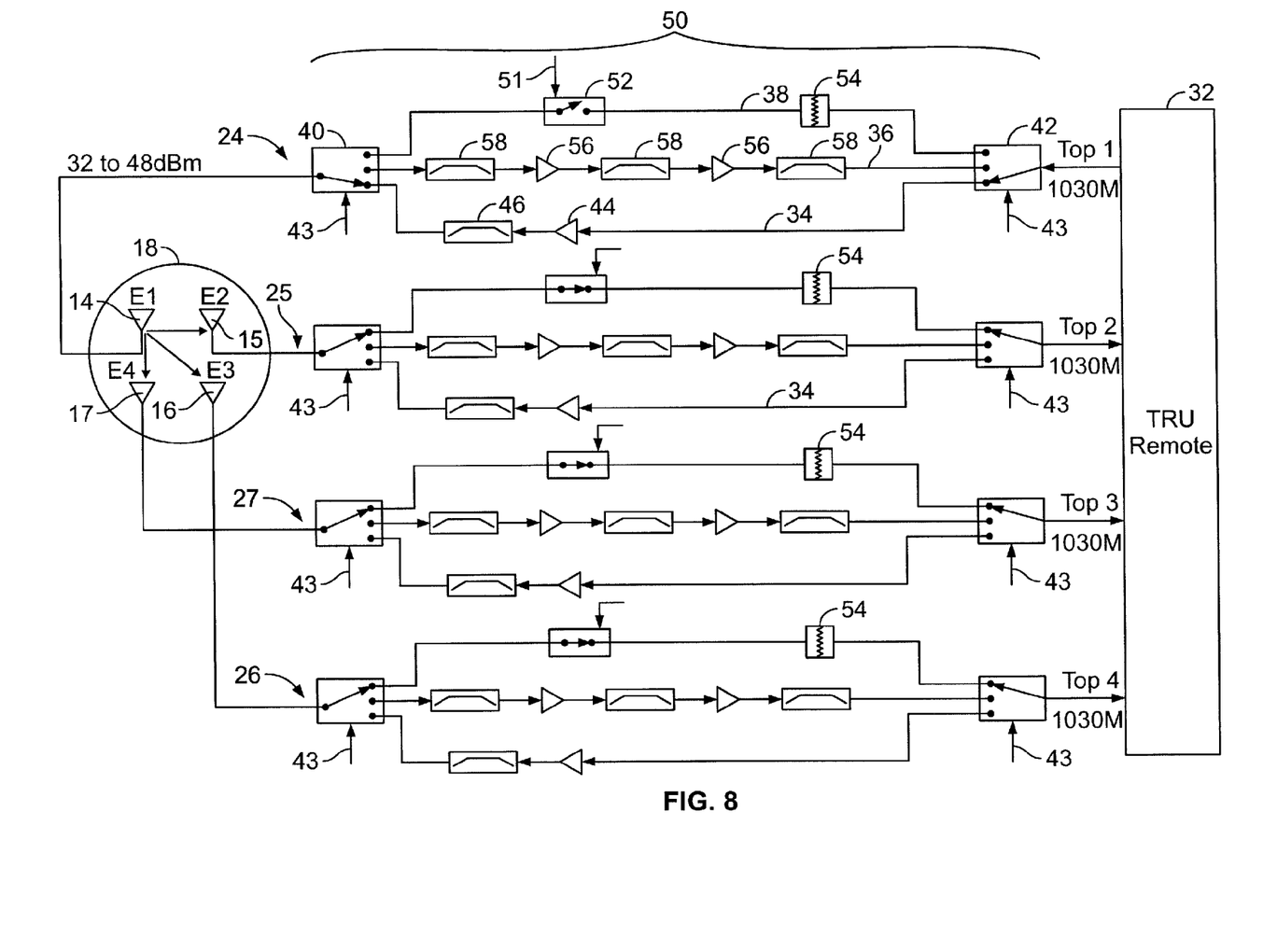
FIG. 8 illustrates a block diagram of a surveillance system with switches set in a select combination of paths.

FIG. 8 illustrates a block diagram of the active component PCB 50 of FIG. 2 as joined to the T/R unit 32 and antenna PCB 18. FIG. 8 illustrates a portion of the system 10 set up to perform transmit calibration. The active component 50 is configured such that the switches 40 and 42 set channel 24 to utilize the transmit path 34, while channels 25-27 utilize the calibration paths 38. The calibration path 38 in channel 24 is opened at 52 by control signal 51 to provide additional channel isolation. A local oscillator (LO) at the T/R unit 32 is switched to an appropriate frequency (e.g., 1090 MHz) to receive the transmitted Whisper/Shout interrogation sequence that performs the calibration operation of transmit channel 24. The transmit unit 80 in channel 24 is set to transmit the interrogation sequence at a transmit frequency (e.g., 1030 MHz).

Figure 9A:
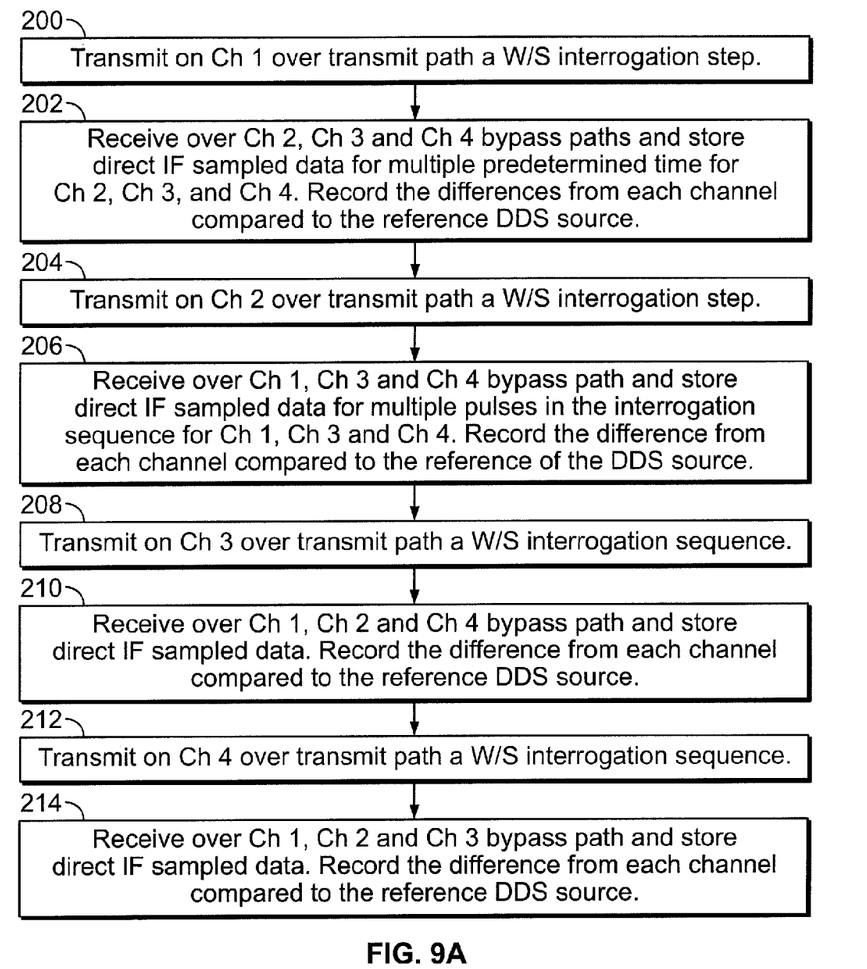
FIGS. 9A and 9B illustrate a processing sequence carried out in connection with a transmit calibration operation.
Figure 9B:
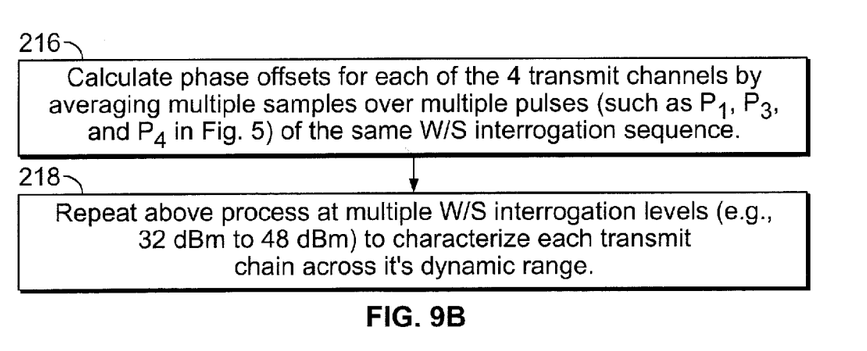

FIG. 9 illustrates a processing sequence carried out in accordance with a transmit calibration process. At 200, the system 10 transmits on channel E1, along the transmit path 34, a Whisper/Shout interrogation step (FIG. 5). At 202, the T/R unit 32 receives over the calibration paths 38 in channels 25, 26, and 27 (corresponding to channels E2, E3, and E4). Channels E2, E3, and E4 supply receive signals detected at antenna elements 15, 16, and 17, respectively. The receive signals are digitized through downconverted direct IF sampling within the T/R unit 32 to form a digital data stream with each channel E2-E4. The T/R unit 32 processes the digital data streams received over channels E2, E3, and E4 and the relative transmit phase differences are derived from the relationship between the phase received by each antenna element and receive channel compared to the reference of the DDS module 53. The phase difference between the DDS module 53 and channel E2, while transmitting on channel E1, shall be denoted as $\Psi_{12}$. Likewise the phase difference between the DDS module 53 and channel E3, while transmitting on channel E1, shall be denoted as $\Psi_{13}$ and the phase difference between the DDS module 53 and channel E4, while transmitting on channel E1, shall be denoted as $\Psi_{14}$. Each of the phase offsets derived from the difference are recorded in memory 59.

At 204, the switches 40 and 42 (FIG. 8) are adjusted to connect, within channel E2, the transmit path 34. In channel E1, switches 40 and 42 are adjusted to disconnect the transmit path 34 and connect the calibration path 38. At 204, antenna element 15 transmits a Whisper/Shout interrogation step. At 206, channels E1, E3, and E4 receive the transmitted Whisper/Shout interrogation step and convey the receive signals over calibration paths 38 to the T/R unit 32. The T/R unit 32 processes the digital data streams received over channels E1, E3, and E4 and again the transmit phase differences are derived from the relationship between the phase received by each antenna elements 14, 16, 17 and receive channels E1, E2, E4 are compared to the reference of the DDS module 53. Using similar notation as above, the phase offsets are determined as $\Psi_{21}$, $\Psi_{23}$, and $\Psi_{24}$ when transmitting on channel E2 and receiving on channels E1, E3, and E4 respectively. Each of these phase offsets are recorded in memory 59.

At 208, the switches 40 and 42 (FIG. 8) are adjusted to connect, within channel E3, the transmit path 34. In channel E2, switches 40 and 42 are adjusted to disconnect the transmit path 34 and connect the calibration path 38. At 208, antenna element 16 transmits a Whisper/Shout interrogation step. At 210, channels E1, E2, and E4 receive the transmitted Whisper/Shout interrogation step and convey the receive signals over calibration paths 38 to the T/R unit 32. The relative transmit phase differences between the phase received by each antenna elements 14, 16, 17 and receive channels E1, E2, E4 are compared to the reference of the DDS module 53 and determined as $\Psi_{31}$, $\Psi_{32}$, and $\Psi_{34}$ when transmitting on channel E3 and receiving on channels E1, E2, and E4, respectively. Each of these phase offsets are recorded in memory 59.

At 212, the switches 40 and 42 (FIG. 8) are adjusted to connect, within channel E4, the transmit path 34. In channel E3, switches 40 and 42 are adjusted to disconnect the transmit path 34 and connect the calibration path 38. At 212, antenna element 17 transmits a Whisper/Shout interrogation step. At 214, channels E1, E2, and E3 receive the transmitted Whisper/Shout interrogation step and convey the receive signal over calibration paths 38 to the T/R unit 32. The relative transmit phase differences between the phase received by each antenna elements 14, 16, 17 and receive channel are compared to the reference of the DDS module 53 are determined as $\Psi_{41}$, $\Psi_{42}$, and $\Psi_{43}$ when transmitting on channel E4 and receiving on channels E1, E2, and E3, respectively. Each of these phase offsets are recorded in memory.

At 216 each of the phase offsets generated from the above process are stored at 218 for a given power level. The process of 200-218 is repeated for each Whisper/Shout interrogation step to fully characterize each transmit channel across the full dynamic range of each transmit channel. For example, referring to FIG. 6, steps of 200-218 are repeated for each Whisper/Shout interrogation step shown in FIG. 6 between 32 dB and 48 dB.

In the foregoing manner, the processor module 55 characterizes each of the transmit paths 34 while simultaneously transmitting interrogation signals associated with a surveillance operation. The interrogation signals may be transmitted as part of a TAS/TCAS Whisper/Shout pulse sequence (reference power limiting and interference limiting DO197A, DO185A). During the Whisper/Shout pulse sequence, the antenna array 12 transmits a series of pulses at progressively greater power levels. For example, each pulse may be separated by at least 1 dB from the previous pulse (e.g., between 32 dB and 48 dB).

In addition, the processor module 55 also uses the loop-backed Whisper/Shout process to characterize the amplitude variations within each transmit path 34. A specific power level is transmitted from a single antenna element (e.g., 14). The other three antenna elements (e.g., 15-17) of the active antenna array 12 are used to monitor the log-sum video or amplitude of the channel 24 conveying the transmit signal to the antenna element 14. The log video of each calibration path 38 is a highly accurate power measurement method. In normal operation, the log sum video is used to determine signal power, minimum threshold levels (MTL) and pulse rise and fall time of an intruder aircraft or interrogated aircraft.

The processor module 55 uses the fact that a single antenna element (e.g., 14) may be driven resulting in a directional pattern for each of the Whisper/Shout pulses. During calibration, the transmitter unit 80 transmits an interrogation signal only from a single antenna element 14. Due to the geometry of the antenna array 12, the antenna element 14 exhibits directional convergence of the interrogation signal within one sector of the range about the protected aircraft. In the example of FIG. 8, the lowest Whisper/Shout pulse is sent to the channel 24. The other three channels 25-27 are switched to a 1030 MHz calibration mode that bypasses the LNAs 56 and filters 58 that are tuned to the receive frequency as aforementioned. This way the 1030 MHz signal can be received by the receiver units 71-73 (FIG. 1) directly. The measured powers on the three channels 25-27 are summed and averaged together by the processor module 55 to yield an average measured transmit power level. The average measured transmit power level is used to fine tune the drive signals conveyed over the transmission line 28 to the power amplifier 44 in the channel 24 that is transmitting in the active phased antenna array 12. Additionally the look-up table in memory 59 is formulated with the measured transmit power level corresponding to the set output power level.

As explained above, the antenna element 15 is driven similarly at the lowest Whisper/Shout level, thereby initiating a single Whisper/Shout step for the second sector. Channels 24, 26 and 27 are switched to the calibration path 38 and the power level of the measured signal is monitored, adjusted and entered at the T/R unit 32 into a look-up table in the memory 59. Next, the antenna element 16 is driven at the same Whisper/Shout level, and the channels 24, 25 and 27 are switched to the calibration path 38. Power levels of the received signals are measured, adjusted and stored in the memory 59. The last step for the lowest power level Whisper/Shout step is repeated at antenna element 17, while the calibration paths 38 in channels 24-26 are measured, and characterized similarly for the fourth sector. As noted, more or fewer antenna elements may be utilized. Similarly, the number of sectors and size of each sector may be greater or fewer than four.

The processor module 55 repeats the process for the next higher Whisper/Shout power level for each of the antenna elements 14-17. The process continues until Whisper/Shout steps are complete across the dynamic range of each transmitting antenna element 14-17 when driven independently. The stepped amplitude calibration operation fully characterizes the power output of each of the antenna elements 14-17.

The aforementioned Whisper/Shout sequence is used to characterize the phase of each channel 24-27 as well as the amplitude. The phase detector module 57 measures the relative phase of each antenna element 14-17 as compared to the DDS module 53, at each transmit power level, as well as the amplitude. The phase detector module 57 stores, in memory 59, a LUT (Look-Up-Table) for the correct phase and a LUT for the correct amplitude of each channel 24-27. The DDS module 53 adjusts the transmit phase of the four channels 24-27 to facilitate beam forming in the desired antenna transmission pattern. The DDS module 53 provides the correct calibrated phase to each channel 24-27 based on a cosine look-up table in memory 59. The signals generated by the DDS module 53 are provided at an intermediate frequency (IF) (e.g., 75 MHz) and are up converted (e.g., to 1030 MHz). Once up converted, the transmit signals are filtered and amplified by the low level stages in the transmit modules 80-83 before being conveyed over the transmission lines 28-31. The transmit signals are provided to the antenna module 20 at a relatively low power level and are amplified by power amplifiers 44 on the active component PCB 50 for transmission.

The phase detector module 57 measures transmit phase using the relationship between the phase received by adjacent antenna elements 14-17 and receive channels 24-27 compared to the reference phase of signal $f_3$ produced by the DDS module 53. A clock of frequency $f_1$ within the DDS module 53 is used to generate both a transmit signal at frequency $f_2$ and a reference phase signal at frequency $f_3$. The transmit signal at frequency $f_2$ is up-converted to 1030 MHz and delayed by the insertion phase of the active channel, cables, and transmit paths 34. The 1030 MHz signal is transmitted by one antenna element and received on the remaining antenna elements. The signal is routed through the corresponding calibration paths, cables, etc. to the LRU and subsequently down-converted to frequency $f_3$. The phase detector module 57 finds the difference between the down-converted signal at frequency $f_3$ and the reference phase signal at frequency $f_3$. The processor module 55 is able to build a matrix to fully characterize the phase offset for each antenna element 14-17 and channel 24-27 by transmitting on each of the four channels 24-27 independently at each discrete power level and monitoring the phase difference between the reference phase signal at frequency $f_3$ and each of the three remaining channels 24-27. It is sufficient to measure a subset of the above phase differences (e.g. while transmitting on channel 24, calculate the phase difference between channel 25 and the reference phase signal at frequency $f_3$ and the phase difference between channel 26 and the reference phase signal at frequency $f_3$). The matrix of phase offset information is then used when all 4 antenna elements 14-17 are driven to provide appropriate directionality.

The antenna module 20 supports directional pattern formation while only driving a single antenna element 14-17. Pattern measurements support the directional capability of the antenna module 20 driven from one antenna element 14-17 with the other 3 antenna elements 14-17 terminated in their characteristic impedance.

The system 10 reduces the calibration cycles, thereby reducing the amount of time the system 10 is unavailable to process traffic. The system 10 also reduces the radiation of calibration pulses through the antenna array 12 that effectively are radiated in an already overcrowded radio spectrum that is shared with Air Traffic Control (ATC) and other surveillance systems.

Transmit calibration includes several individual steps used to calibrate the bias point for each of the 4 LDMOS output devices as well as configuring the system 10 properly for RF loop back used to establish both phase and amplitude correction. Amplitude correction is used to verify a factory setting of the minimum threshold level (MTL) and compensate for changes in LNA/Receiver gain as well as differences in cabling. Automatic phase calibration is used to compensate for unknown receiver, transmitter, and cable insertion phases which have a direct impact on both bearing determination as well as directional transmit pattern formation.

The following equations show the matrix completed by the processor module 55 and stored in memory 59 during transmit calibration.

TX Cal Matrix
TX Path 1:

$$Path_{12} = T_1 + \lambda/4 + R_2 = \Psi_{12}$$

$$Path_{13} = T_1 + \sqrt{2}\lambda/4 + R_3 = \Psi_{13}$$

$$Path_{14} = T_1 + \lambda/4 + R_4 = \Psi_{14}$$

TX Path 2:

$$Path_{21} = T_2 + \lambda/4 + R_1 = \Psi_{21}$$

$$Path_{23} = T_2 + \lambda/4 + R_3 = \Psi_{23}$$

$$Path_{24} = T_2 + \sqrt{2}\lambda/4 + R_4 = \Psi_{24}$$

TX Path 3:

$$Path_{31} = T_3 + \sqrt{2}/4 + R_1 = \Psi_{31}$$

$$Path_{32} = T_3 + \lambda/4 + R_2 = \Psi_{32}$$

$$Path_{34} = T_3 + \lambda/4 + R_4 = \Psi_{34}$$

TX Path 4:

$$Path_{41} = T_4 + \lambda/4 + R_1 = \Psi_{41}$$

$$Path_{42} = T_4 + \sqrt{2}/4 + R_2 = \Psi_{42}$$

$$Path_{43} = T_4 + \lambda/4 + R_3 = \Psi_{43}$$

The variables $T_1$, $T_2$, $T_3$, $T_4$=total transmit channel phase for each respective channel (includes cables, drivers, switches and power amplifiers). The variables $R_1$, $R_2$, $R_3$, $R_4$=total calibration channel phase for each respective channel (includes cables, switches, pads and DDS reference offset). The following is a matrix equation representation of the above equations.

$$\begin{bmatrix} \Psi_{12} \\ \Psi_{13} \\ \Psi_{14} \\ \Psi_{21} \\ \Psi_{23} \\ \Psi_{24} \\ \Psi_{31} \\ \Psi_{32} \\ \Psi_{34} \\ \Psi_{41} \\ \Psi_{42} \\ \Psi_{43} \end{bmatrix} = \begin{bmatrix} 1 & 0 & 0 & 0 & 0 & 1 & 0 & 0 \\ 1 & 0 & 0 & 0 & 0 & 0 & 1 & 0 \\ 1 & 0 & 0 & 0 & 0 & 0 & 0 & 1 \\ 0 & 1 & 0 & 0 & 1 & 0 & 0 & 0 \\ 0 & 1 & 0 & 0 & 0 & 0 & 1 & 0 \\ 0 & 1 & 0 & 0 & 0 & 0 & 0 & 1 \\ 0 & 0 & 1 & 0 & 1 & 0 & 0 & 0 \\ 0 & 0 & 1 & 0 & 0 & 1 & 0 & 0 \\ 0 & 0 & 1 & 0 & 0 & 0 & 0 & 1 \\ 0 & 0 & 0 & 1 & 1 & 0 & 0 & 0 \\ 0 & 0 & 0 & 1 & 0 & 1 & 0 & 0 \\ 0 & 0 & 0 & 1 & 0 & 0 & 1 & 0 \end{bmatrix} \cdot \begin{bmatrix} T_1 \\ T_2 \\ T_3 \\ T_4 \\ R_1 \\ R_2 \\ R_3 \\ R_4 \end{bmatrix} + \begin{bmatrix} (\frac{\lambda}{4}) \\ (\sqrt{2} \cdot \frac{\lambda}{4}) \\ (\frac{\lambda}{4}) \\ (\frac{\lambda}{4}) \\ (\frac{\lambda}{4}) \\ (\sqrt{2} \cdot \frac{\lambda}{4}) \\ (\sqrt{2} \cdot \frac{\lambda}{4}) \\ (\frac{\lambda}{4}) \\ (\frac{\lambda}{4}) \\ (\frac{\lambda}{4}) \\ (\sqrt{2} \cdot \frac{\lambda}{4}) \\ (\frac{\lambda}{4}) \end{bmatrix}$$

The following equations are used to simplify the mathematics for further manipulation of equations:

$$\phi_{12} = \Psi_{12} - \frac{\lambda}{4}$$

$$\phi_{13} = \Psi_{13} - \sqrt{2} \cdot \frac{\lambda}{4}$$

$$\phi_{14} = \Psi_{14} - \frac{\lambda}{4}$$

$$\phi_{21} = \Psi_{21} - \frac{\lambda}{4}$$

$$\phi_{23} = \Psi_{23} - \frac{\lambda}{4}$$

$$\phi_{24} = \Psi_{24} - \sqrt{2} \cdot \frac{\lambda}{4}$$

$$\phi_{31} = \Psi_{31} - \sqrt{2} \cdot \frac{\lambda}{4}$$

$$\phi_{32} = \Psi_{32} - \frac{\lambda}{4}$$

$$\phi_{34} = \Psi_{34} - \frac{\lambda}{4}$$

$$\phi_{41} = \Psi_{41} - \frac{\lambda}{4}$$

$$\phi_{42} = \Psi_{42} - \sqrt{2} \cdot \frac{\lambda}{4}$$

$$\phi_{43} = \Psi_{43} - \frac{\lambda}{4}$$

By manipulation of the transmit path equations, the offsets can be represented as the difference between elements. The following equations represent the relative phase difference between individual transmit paths based off the measured phase data.

$$T_1 - T_2 = (\phi_{13} - \phi_{23} + \phi_{12} - \phi_{24} - \phi_{42} + \phi_{34} - \phi_{31} + \phi_{41})/2$$

$$T_2 - T_3 = (\phi_{24} - \phi_{34} + \phi_{23} - \phi_{31} - \phi_{13} + \phi_{41} - \phi_{42} + \phi_{12})/2$$

$$T_3 - T_4 = (\phi_{31} - \phi_{41} + \phi_{34} - \phi_{42} - \phi_{24} + \phi_{12} - \phi_{13} + \phi_{23})/2$$

$$T_4 - T_1 = (\phi_{42} - \phi_{12} + \phi_{41} - \phi_{13} - \phi_{31} + \phi_{23} - \phi_{24} + \phi_{34})/2$$

$$T_1 - T_3 = (\phi_{13} + \phi_{12} - \phi_{34} - \phi_{31} - \phi_{23} - \phi_{42} + \phi_{24} + \phi_{41})/2$$

$$T_2 - T_4 = (\phi_{23} + \phi_{24} - \phi_{42} - \phi_{41} - \phi_{13} - \phi_{34} + \phi_{12} + \phi_{31})/2$$

The following equations represent a means to verify that the actual measured phase difference $\phi_{XX}$ is within a given tolerance (e.g. 2.5 degrees), labeled $\epsilon_T$. This is used for error detection.

$$(T_1 - T_2) + (T_2 - T_3) + (T_3 - T_4) + (T_4 - T_1) = \Sigma \phi_{XX}\text{'s}$$

$$\epsilon_T > |(2\phi_{12} + 2\phi_{23} + 2\phi_{34} + 2\phi_{41} - 2\phi_{13} - 2\phi_{24} - 2\phi_{31} - 2\phi_{42})/2|$$

or $$\epsilon_T > |(\phi_{12} + \phi_{23} + \phi_{34} + \phi_{41} - \phi_{13} - \phi_{24} - \phi_{31} - \phi_{42})|$$

A receiver calibration sequence may include a factory baseline calibration process. The factory calibration process includes a configuration that uses phase matched cables connected to a known source/generator. With phase matched cables, any offsets are true insertion phases of the receiver channel so this establishes a known reference. This self calibration process will factor in the difference between factory matched cables and the indeterminate cable phases from the field installation (since these are not shipped as a matched set). Transmit calibration is performed in a similar manner as stated above for receiver calibration except in a test set with phase matched cables, rather than an antenna. Factory calibration offsets are stored in memory.

By factoring in the differences of the factory stored data to the installed configuration, a baseline for the receiver startup will be established. This factory stored data contains a complete set of measurements and presents a more accurate averaged set of offsets. Subsequent calibration can use a limited set of these measurements to speed process and/or eliminate steps. Optionally, temperature extreme baselines may be extrapolated from the saved data. Gross measurement error can be detected and present a fallback position. A rudimentary calibration for bearing detection would be available given unforeseen circumstances such as co-channel interference impacting measurements, isolation/leakage, and large unexplained measurement errors. Additionally amplitude baseline shall be established in the installation by establishing cable losses by looping back 1030 MHz signal with all bypass paths activated and comparing this to factory stored data.

Also a transmit calibration sequence may include a factory baseline calibration process. This would include a configuration that uses phase matched cables operating into a known sink/measurement device. With phase matched cables any offsets are true insertion phases of the transmit chains so this establishes a known reference and allows complete characterization of each transmit channel measured from accurate test equipment. Additionally these phase matched cables are also loss characterized which allows amplitude characterization of each transmit channel of the device under test as well as phase. Transmit calibration is performed in a similar manner as stated above for receive calibration and the factory offsets are stored in memory.

Upon completion, the installed unit will initiate self calibration by executing a single calibration sequence at the lowest power setting for each of the sectors. The offsets will be compared against the factory saved offsets and this will establish the transmitter startup baseline (difference will be mainly due to cables). All factory calibration offsets will be corrected to reflect installation configuration. A normal calibration sequence will then be executed and the offsets generated shall be compared against the startup configuration just saved. Differences shall be compared against predefined limits.

Optionally, the system 10 may perform a calibration sequence in connection with the antenna located on the bottom of the aircraft for omni-directional transmissions. The system 10 first sets each channel 24-27 such that the calibration paths are joined to the antenna elements 14-17. At the T/R unit 32, a local oscillator (LO) utilized in connection with the receivers is joined to the receive channels and driven at 1090 MHz. A transmit calibration sequence is performed at 1030 MHz. Stored cable losses are utilized from prerecorded system characteristics and from factory baseline data to determine differences in upper cable loss to compensate for bottom cable loss.

While the invention has been described in terms of various specific embodiments, those skilled in the art will recognize that the invention can be practiced with modification within the spirit and scope of the claims.

What is claimed is:

1. A method for calibrating an aircraft surveillance system for a protected aircraft, the system having a phased antenna array comprising antenna elements, the method comprising:
    transmitting a first signal from a first antenna element in the antenna array;
    receiving the first signal at a third antenna element in the antenna array;
    transmitting a second signal from a second antenna element in the antenna array;
    receiving the second signal at the third antenna element;
    calculating calibration information for the antenna array based on the first and second signals received at the third antenna element; and
    wherein the first and second signals constitute interrogation signals transmitted in connection with a Whisper/Shout pulse sequence to locate potential intruding aircraft within a range of the protected aircraft.

2. The method of claim 1, wherein the antenna elements are selectively joined to separate transmit, receive and calibration paths provided in the antenna module, the method including joining the third antenna element to a calibration path to bypass a corresponding receive path through the antenna module.

3. The method of claim 1, wherein the first and second antenna elements transmit the first and second signals at successive different points in time while no other antenna elements in the antenna array are transmitting.

4. The method of claim 1, wherein the first antenna element transmits the first signal while no other antenna elements in the antenna array are transmitting.

5. The method of claim 1, wherein the receiving steps include storing relative phase differences associated with the first and second signals.

6. The method of claim 1, wherein the antenna array constitutes an active antenna array.

7. The method of claim 1, wherein the calculating includes determining a phase calibration offset between first and second transmit channels associated with the first and second antenna elements, respectively, and storing the phase calibration offset.

8. The method of claim 1, wherein the transmitting includes transmitting multiple first signals from the first antenna element at progressively greater power levels.

9. The method of claim 1, wherein the calculating includes determining a measured phase difference between the first interrogation signal received at the third antenna element and the second interrogation signal received at the third antenna element.

10. The method of claim 1, further comprising configuring the antenna array to perform directional transmitting and receiving operations, wherein the calibration information corrects the directional transmitting and receiving operations.

11. The method of claim 1, wherein each antenna element is associated with a unique transmit channel and a unique receive channel which are external to a remote transmit and receive unit, the calibration information correcting for insertion losses within corresponding transmit and receive channels.

12. The method of claim 1, wherein the transmitting and receiving are repeated for multiple signals such that the calibration information characterizes a dynamic range of transmit and receive channels associated with each of the antenna elements.

13. A method for calibrating an aircraft surveillance system for a protected aircraft, the system having a phased antenna array comprising antenna elements, the method comprising:
    transmitting a first interrogation signal from a first antenna element in the antenna array, the first interrogation signal constituting part of a surveillance transmit sequence, wherein the first interrogation signal constitutes part of a Whisper/Shout pulse sequence;

receiving the first interrogation signal at a second antenna element in the antenna array; and
calculating calibration information for the antenna array based on the first interrogation signal received by the second antenna element.

14. The method of claim 13, wherein the antenna elements are selectively joined to separate transmit, receive and calibration paths provided in the antenna module, the method including joining the second antenna element to a calibration path to bypass a corresponding receive path through the antenna module.

15. The method of claim 13, wherein the receiving includes storing relative phase differences associated with the first interrogation signal.

16. The method of claim 13, wherein the antenna array constitutes an active antenna array.

17. The method of claim 13, wherein the transmitting includes transmitting multiple first signals from the first antenna element at progressively greater power levels.

18. The method of claim 13, further comprising configuring the antenna array to perform directional transmitting and receiving operations, wherein the calibration information corrects the directional transmitting and receiving operations.

19. The method of claim 13, wherein each antenna element is associated with a unique transmit channel and a unique receive channel which are external to a remote transmit and receive unit, the calibration information correcting for insertion losses within corresponding transmit and receive channels.

20. The method of claim 13, further comprising transmitting a second interrogation signal from a third antenna element in the antenna array, the second interrogation signal constituting part of the surveillance transmit sequence, wherein the first and third antenna elements transmit the first and second signals, respectively, at successive different points in time while no other antenna elements in the antenna array are transmitting.

21. The method of claim 19, wherein the calculating includes determining a phase calibration offset between first and third transmit channels associated with the first and third antenna elements, respectively, and storing the phase calibration offset.

22. The method of claim 20, wherein the calculating includes determining a measured phase difference between the first interrogation signal received at the second antenna element and the second interrogation signal received at the second antenna element.

* * * * *